March 23, 1971     E. F. GOURLEY     3,572,195
QUICK-CHANGE TOOLPOST
Filed July 22, 1968     2 Sheets-Sheet 1
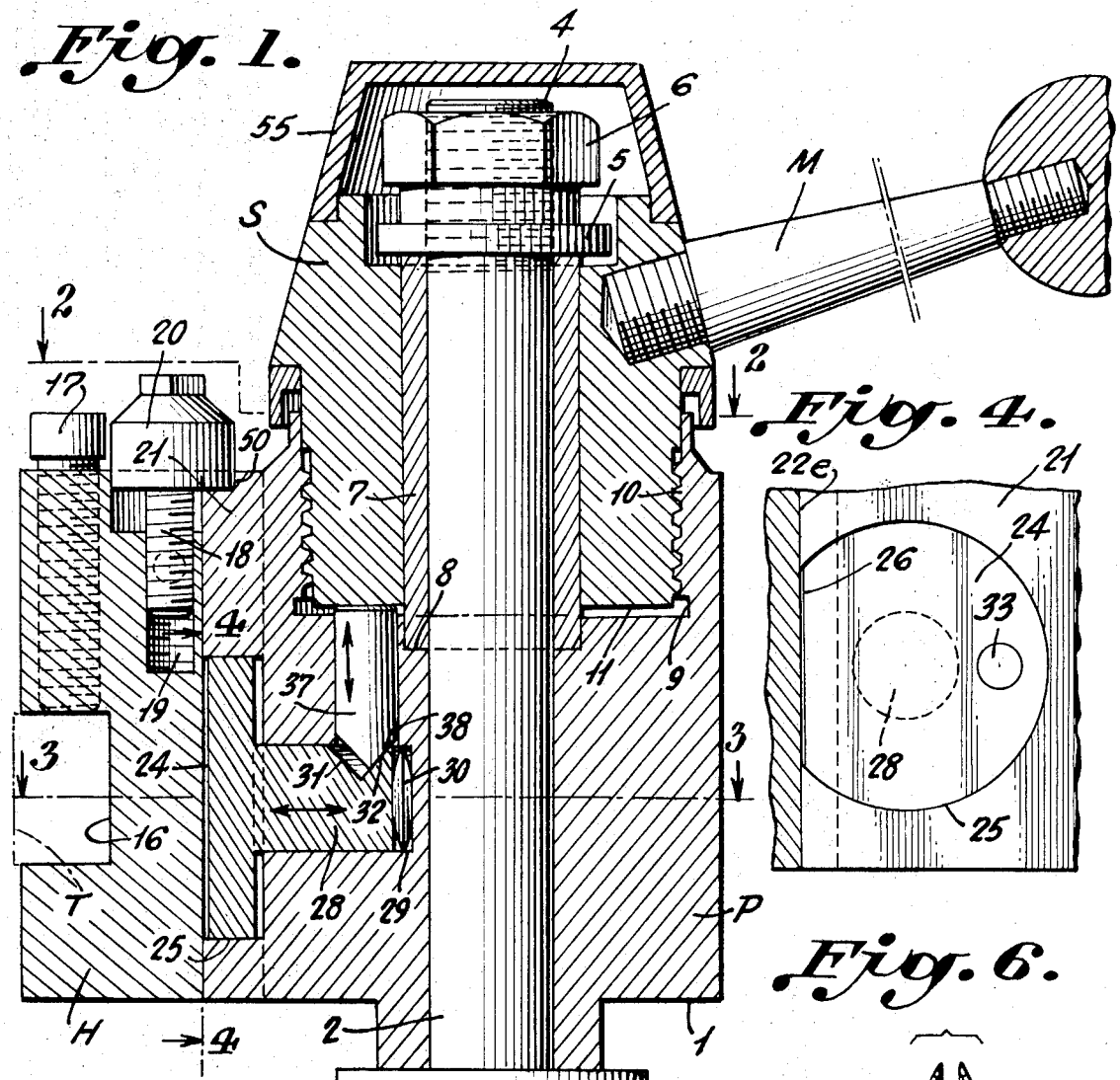
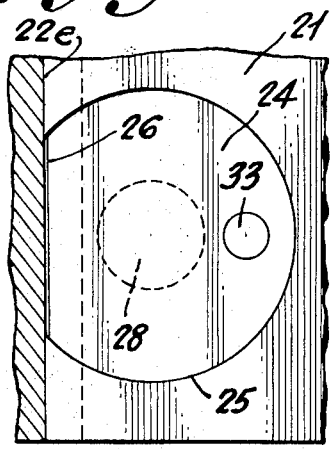
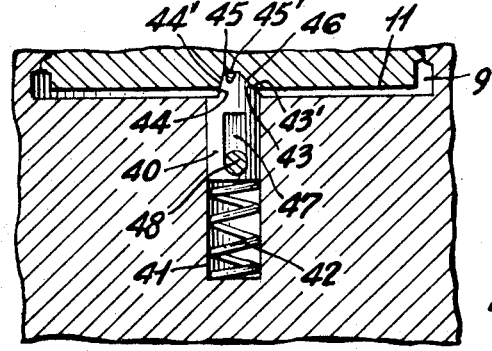
INVENTOR
EUGENE F. GOURLEY
BY *Samuel Schwartz*
ATTORNEY March 23, 1971 E. F. GOURLEY 3,572,195
QUICK-CHANGE TOOLPOST
Filed July 22, 1968 2 Sheets-Sheet 2
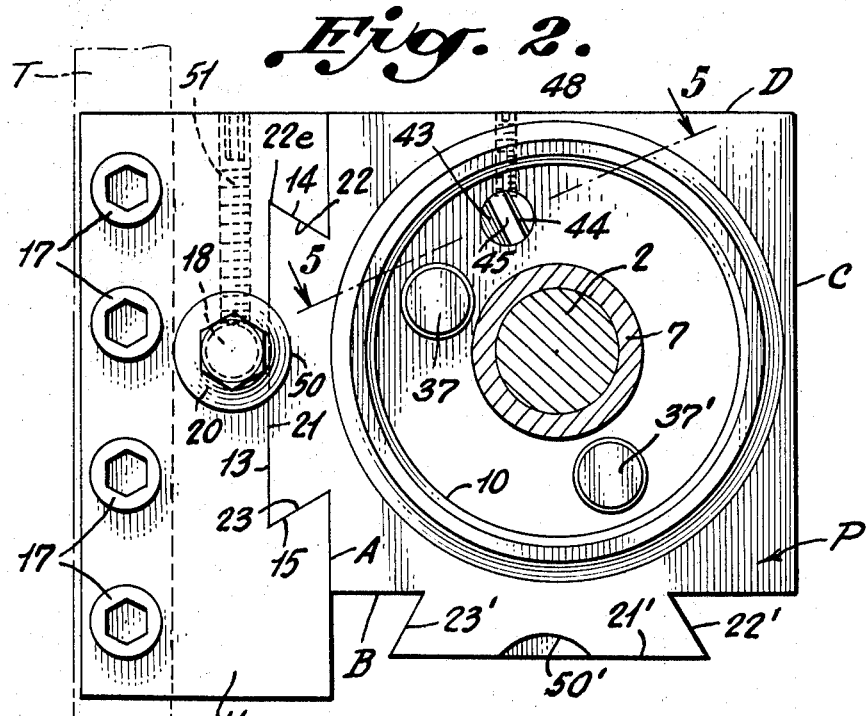
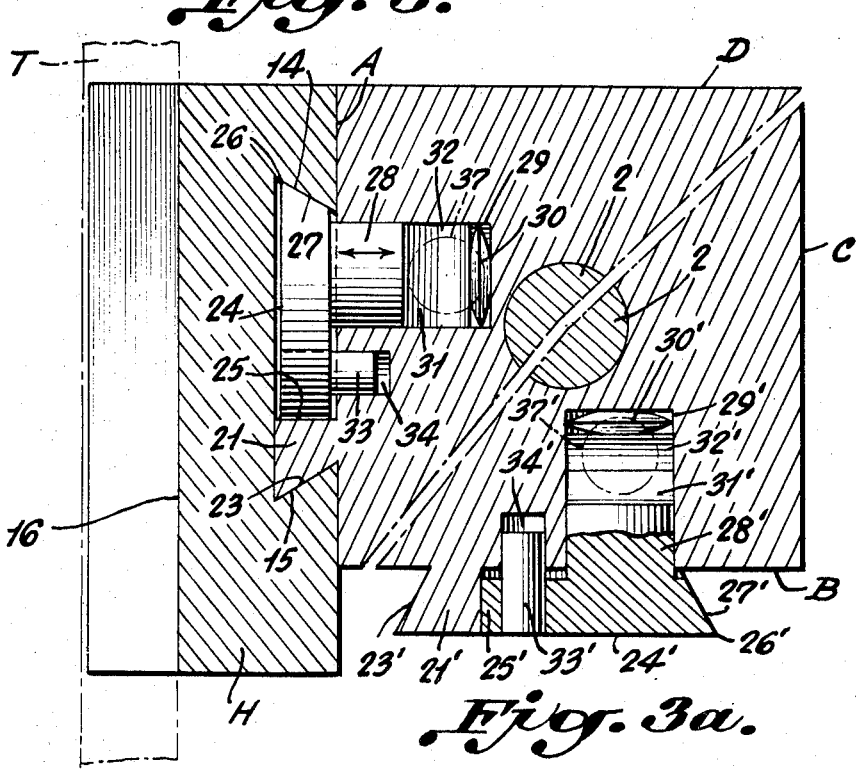
INVENTOR
EUGENE F. GOURLEY
BY
ATTORNEY United States Patent Office 3,572,195
Patented Mar. 23, 1971

3,572,195
QUICK-CHANGE TOOLPOST
Eugene F. Gourley, Meadville, Pa., assignor to McCrosky Tool Corporation, Meadville, Pa.
Filed July 22, 1968, Ser. No. 746,529
Int. Cl. B23b 29/08
U.S. Cl. 82—36
12 Claims

ABSTRACT OF THE DISCLOSURE

A toolpost adapted to be affixed to a lathe or similar machine, and embodying a clamping mechanism therein for quickly attaching and detaching a toolholder relative thereto, at a predetermined level, through the intermediary of vertically disposed complementary dovetail-shaped fittings on the toolholder and on at least one face of the toolpost, the latter of which includes a horizontally movable clamping member shaped essentially as a surface of revolution. In the illustrated embodiment of the invention, the latter comprises a disk-shaped outer portion, truncated along a vertical chord, and a suitably recessed cylindrical inner portion, the rapid and simple movement of which, in a to-and-fro direction, controls the clamping and releasing effects on the toolholder.

---

The invention relates to toolposts for interchangeably accommodating toolholders supporting machining tools of different types adapted to operate successively on work-pieces, and presents an improvement on the tool assemblies which are disclosed in Pats. Nos. 2,878,705, Mar. 24, 1959; 2,972,272, Feb. 21, 1961; 3,024,686, Mar. 13, 1962; 3,107,562, Oct. 22, 1963; and 3,308,697, Mar. 14, 1967; as well as others.

It is the object of the present invention to provide a rugged and reliable quick-change turret toolpost assembly possessing the capability of interchangeably mounting a plurality of toolholders on one or more faces of the toolpost, while assuring a uniform setting of the tools relative to the work-piece in the course of the several interchanges of the tools on the post.

It is another object of the invention to provide a toolpost with a clamping mechanism for interchangeable toolholders which may be combined therewith, which is operable with safety and rapidity, and which is composed of relatively few parts of simple construction capable of rendering service over a long period of time without undue wear.

It is another object of the invention to provide a toolpost block with two toolholder stations adjacent to each other, with one or more clamping devices embodied therein, one of which is effective to exert a clamping action on the toolholder which is mounted on one face of the toolpost, and which may be quickly clamped thereto by a simple movement of a handle by the operator, and which may be released from the toolpost by a like movement in the reverse direction. The extent of the manual movement by the operator may be limited by a spring detent device in the toolpost cooperating with the handle, which assures both safety and efficiency in the execution of the mounting and demounting movements of the toolholder onto the toolpost.

Other objects and purposes will appear from the detailed description of the invention following hereinafter, taken in conjunction with the accompanying drawings wherein FIG. 1 is a vertical sectional view, with certain parts in elevation, of a preferred embodiment of the invention;

FIG. 2 is a horizontal sectional view along line 2—2 of FIG. 1;

FIG. 3 is a partial horizontal sectional view along line 3—3 of FIG. 1;

FIG. 3a is a partial horizontal sectional view along line 3—3 of FIG. 1 in the raised position of the handle sleeve;

FIG. 4 is a vertical sectional view along line 4—4 of FIG. 1;

FIG. 5 is a vertical sectional view along line 5—5 of FIG. 2; and

FIG. 6 is an enlarged view of the components of the Belleville spring assemblies shown in FIGS. 1 and 3.

In the drawings is shown a toolpost block P which is adapted to be rigidly mounted on a lathe or analogous machine by affixing the base 1 of the block onto the latter through a center bolt 2 extending upwardly through the bored center of the toolpost with the lower head end 3 of the center bolt engaging the T-slot of the lathe and the upper threaded end of the bolt 4 receiving a washer 5 and threaded nut 6 to clamp the toolpost onto the lathe through the intermediary of the pilot bushing 7 which presses against an annular shoulder 8 in the block surrounding the center bolt, to secure the bottom 1 of the toolpost to the lathe bed, as is well known in the prior art. The bushing 7 is retained in the body of the toolpost with a lightly pressed fit and serves to assume the thrust of the clamping pressure of the nut 6 and washer 5 when the unit is secured to the compound of a lathe.

The upper end of the toolpost is provided with a central cylindrical cavity 9, the internal lateral face of which is threaded with coarse threads 10 for engaging the complementally externally threaded sleeve S from which protrudes the handle M. The movement of handle M for a limited extent, controls the clamping and releasing positions of the mechanism in accordance with the invention.

The cylindrical center of sleeve S is of slightly greater diameter than the external diameter of the pilot bushing 7, to permit rotation of the sleeve without binding. The rotary movement of the handle M, for a limited throw, for example, approximately 120°, results in a translating movement of the sleeve S to lift the bottom end 11 thereof from the bottom of the cavity 9 to a raised position, to effect a release of the clamping mechanism, as fully explained below.

As clearly shown in FIGS. 2 and 3, the toolpost P in accordance with the invention is preferably square in horizontal cross-section with four faces A, B, C and D. Two adjacent faces A and B are each provided with dovetail-shaped tenons 21 and 21', respectively, extending outwardly therefrom. The provision of tenons on two faces permits a greater adaptability of the toolpost for the mounting of toolholders selectively on the two faces thereof, each of which is provided with identical clamping devices, even though only one is used at one time. In the illustrated embodiment, the toolholder H is shown mounted on the face A of the toolpost containing tenon 21 with the appurtenant clamping mechanism therein. The clamping mechanism forming part of tenon 21' is identical to that in tenon 21, and the parts thereof have been designated by the same reference characters as those forming part of tenon 21 with the distinction that each of the reference characters has been primed. Thus, the toolholder H is adapted to be clamped onto the face B of the toolpost P in the same manner as the toolholder is clamped onto the face A.

As clearly shown in FIG. 1, the toolholder H is of conventional design and is provided with a lateral slot 16 for the purpose of receiving a tool T which is clamped to the toolholder by means of a series of clamping bolts 17 extending through the body of the upper portion of the toolholder. The tool T may be a cutting bit, boring tool, knurling tool, cut-off tool, etc. Furthermore, the toolholder is provided with a screw bolt 18 which is adjustably engaged in the threaded bore 19 in the body of the toolholder, and the head 20 of which overlies the tenon 21 which is preferably machined with an arcuate seat 50 for seating securely the bottom of the bolt head 20, thereby to control the vertical position of the toolholder relative to the toolpost. As is well known in the art, the toolpost and toolholder are provided with complementary dovetail-shaped fittings 21 and 13, respectively, so that the toolholder may be dropped onto the toolpost to the extent permitted by the head of the height-adjusting screw 18 dropping onto the seat 50, and thereafter the toolholder is clamped laterally to the face of the toolpost to secure tightly the toolholder and the tool retained therein to the toolpost so that the machining operation performed by the tool may be executed with accuracy, reliability and with minimum vibration. Each toolholder H is provided with a height adjusting screw which may be pre-set to position the cutting tool at the proper height corresponding to the machine-center height.

The invention herein is concerned with the provision of a locking or clamping assembly for the selected toolholder which is rugged and reliable and which is effective for long periods of time with minimal wear of the parts.

The locking or clamping member, seated within and adjacent to one side of tenon 21, is formed of an outer disk-like portion 24 of slightly lesser thickness than tenon 21, and an integral cylindrical piston-like portion 28 extending rearwardly therefrom (FIGS. 1, 3, 3a and 4), which together, in essence, may be considered a surface of revolution, which may be machined from a piece of round bar stock and suitably heat-treated for wear resistance. The outer portion 24, with its main circumferential portion 25 (FIG. 4), is truncated along a vertical chord 26 which in its outermost position coincides with the intersecting edge 22e formed by the outermost face of tenon 21 and the short inclined face 22 extending rearwardly between the latter and face A of the toolpost block P.

The truncated edge 27 of the outer portion 24 (FIG. 3), extends rearwardly from the chord 26 for the whole depth of the outer portion, and at an inclination corresponding to that of inclined face 22 of the tenon 21 as well as the inclined or sloping edge 14 forming one side of the mortise on the toolholder H. The segmental disk portion of the clamping member 24, defined principally by the circular periphery 25, is nested within a correspondingly shaped segmental cylindrical recess of slightly larger dimension than the outer portion 24, in the body of the tenon 21, adjacent to one side thereof.

As described above, the rearwardly sloping face 27 of the clamping member is of the same inclination as the inclined face of the tenon tapering from edge 22e above and below the gap therein which is bridged by the chord 26. The inclined face is movable within the recess in the tenon for a limited extent, as indicated in FIGS. 1 and 3, to position the disk-like portion 24 more closely to the base of the tenon, at which time the sloping edge 27 moves against the adjacent inclined face 14, constituting part of the complemental mortise on the toolholder, to clamp the latter tightly against the base of the tenon at one side thereof.

As shown in FIGS. 3 and 4, the other side of the tenon 21 is free of the locking or clamping member 24, and the rearwardly inclined face 23 of tenon 21 is adapted to receive the correspondingly inclined face 15 of the mortise 13 of the toolholder in close interfitting engagement, incidental to the dropping of the toolholder H onto the tenon on the toolpost P.

As indicated clearly by the arrows in FIGS. 1 and 3, the clamping member, consisting of the surface of revolution, is capable of executing translating movements in a horizontal direction to alternately release the toolholder from clamping engagement with the toolpost, or to clamp the same tightly thereto as the clamping member executes the limited movements indicated in the drawings.

As stated above, the locking member seated in the tenon projecting from the face B of the toolpost, is identical, though congruously related, to that seated in tenon 21, projecting from face A, and the corresponding parts are designated with like reference characters, but are primed. The parts are illustrated differently and in fully released position in FIG. 3a to clarify the description.

Normally, the movable clamping members which are seated within the tenons, are in the released condition shown in FIG. 3a, by virtue of the cylindrical pistons or portions 28, 28' which extend into the horizontal cylindrical chambers 29, 29' being pressed outwardly by the pair of dished annular spring washers 30, 30', respectively. The latter exert a resilient force on each piston which tends to press the end thereof from the base of the respective chamber. These Belleville springs are rugged and compact, and are well adapted to reliably press the respective clamping member outwardly so that the parts assume the normal position indicated in FIG. 3a.

A V-shaped recess 31 is cut in the upper portion of the lateral wall of the cylindrical piston or portion 28 below a cylindrical passage in the toolpost thereabove (FIG. 1), in which passage is closely fitted a cylindrical plunger having a plane surface at its upper end and a tapering V-shaped surface at its lower end, so that the rearwardly disposed inclined plane surface 38 is located above the inclined plane surface 32 forming part of the recess 31 in the cylindrical portion 28.

Normally, the Belleville springs 30 force the cylindrical piston outwardly which cams the plunger 37 upwardly if there is suffient space in the cavity 9 in the interior of the toolpost below the handle sleeve S to accommodate the upper projecting end of plunger 37. This is the case when the manually operated sleeve S is in raised position by the rotation of the handle M in a counterclockwise direction. In this position, the outer face of the clamping member 24 is coincident with the plane of the outer face of the tenon 21 which permits the dropping of the toolholder H through the interengagement of the mortise 13 with the tenon 21, or a raising of the toolholder therefrom when a disengagement of the toolholder from the toolpost is being effected.

The rotation of the handle M and the rotary sleeve S connected therewith in the reverse direction, effects a downward movement of the bottom 11 of the sleeve and forces the plunger 37 downwardly to bring the inclined camming face 38 at the lower end thereof against the rearwardly inclined face 32 to force the piston 28 rearwardly against the action of the Belleville springs. This movement forces the sloping edge 27 of the clamping member adjacent to the vertical chord 26 against the inclined face 14 of the mortise, as indicated in FIG. 3.

In order to enforce a rectilinear movement of the clamping member in a horizontal direction relative to the tenon in which it is seated, a pin 33 extends rearwardly from the disk-shaped portion 24 of the clamping member, and is adapted for rectilinear movement in a horizontal cylindrical recess 34 in the body of the toolpost, the cross-section of which recess is slightly larger than the diameter of the pin 33 to permit the movement of the pin 33 therein without binding. Preferably, the pin in the clamping member and the recess in the tool post are disposed on the side of the clamping member opposite to the vertical chord 26. The movement of the pin 33 along an axis displaced from the axis of piston 28 prevents angular movement of the clamping member relative to the toolpost.

In order to limit the throw of the handle M from a position convenient to the operator and to one which would not hinder the safe and rapid mounting and detachment of a toolholder relative to the toolpost, a special detent device is provided in the toolpost at the base of the cylindrical cavity 9 below the bottom 11 of the sleeve S. A top view of this detent is shown in FIG. 2, which permits the throw of the handle M from a comfortable position, at approximately the intersection of faces B and C of the toolpost, to a position approrimately 120° therefrom in a counterclockwise direction which would maintain the handle clear of the left side of the toolpost whereat the tool holder is dropped onto or removed from it. The detent 40 may be cylindrical and is housed in a corresponding recess 41 in the toolpost; it is forced upwardly by a coiled spring 42 above the base of the cavity 9 in the toolpost. The upper end of the detent is formed with a steeply inclined face 44 on one side, and a slightly inclined face 43 on the opposite side, and is topped by a horizontal face 45 at the top thereof. The base 11 of the rotary sleeve S is notched at 46 with corresponding surfaces 43', 44', 45' to seat the detent when the sleeve S is rotated into position when the recess overlies the detent. When this occurs, the steeply inclined faces prevent further movement of the handle in a counterclockwise direction. In the course of such a movement, the lower end 11 of the sleeve is raised sufficiently to have released the vertical plungers 37 and 37' from pressing action against the camming surfaces 32, 32' of the pistons 28 and 28', respectively. The reverse movement of the handle M and the rotary sleeve S is permitted by the juxtaposed surfaces of lesser inclination, 43 and 43', which serves to permit a return of the handle from its rearward position to its forward position with the consequent downward travel of sleeve S and downward movement of the vertical plungers 37, 37', the lower ends of which act to exert a camming force on the pistons 28, 28' to force the same inwardly against the springs 30, 30' and to effect a movement of one of the clamping members against the mortise of the toolholder.

It is evident that the provision of two plungers 37 and 37', (FIG. 2) for the selective control of the locking member on either of the tenons on the faces A and B of the tool post, which are conjointly controlled by the rotation of the sleeve S, produces identical movements at each of the tenons, although only the one cooperating with the mortise of the toolholder is effective. Thus, FIG. 3 illustrates the position of the parts when the handle M is turned to locked position while FIG. 3a illustrates the position of the parts when the handle M is turned in a counterclockwise direction to a position of release.

In order to enable the complete dismantling of the toolpost assembly and the removal of the sleeve S from the toolpost, the spring-loaded detent 40 may be inactivated by locking the detent in its lowered position when the bottom edge 11 of the sleeve S forces it down together with the plungers 37, 37'. A lock screw 48 extending from the face D of the toolpost to a flattened portion 47 on the lateral wall of the detent makes possible the locking of the latter in its lowered position, which permits turning of the handle sleeve S freely beyond its usual limit-stop position to effect a complete disengagement of the sleeve from the body of the toolpost.

The assembly may be furnished with additional refinements such as dust cap 55 and protective skirt against the entry of metallic chips and other foreign matter. These may be threaded or pressed onto the sleeve S in known manner.

Also, the height adjusting screw 18 on each toolholder H may be locked in its adjusted position by lock screw 51.

While the illustrated embodiment of the invention employs tenons on the toolpost block for selective cooperation with a mortise on the toolholder, these dovetail-shaped fittings may be reverse so that the toolholder embodies a dovetail-shaped tenon for selective mounting with the dovetail-shaped mortises on adjacent faces of the toolpost block, as are suggested in some of the above-mentioned patents of the prior art. In such a modified embodiment a single clamping member, movable along an axis intersecting the adjacent rectangular faces containing the mortise channels, may be formed with a vertical truncated chord on each side thereof for selective engagement with a sloping side of a tenon on a toolholder which may be mounted on either face of the toolpost.

While I have described my invention as embodied in a specific form and as operating in a specific manner for purposes of illustration, it should be understood that I do not limit my invention thereto, since various modifications will suggest themselves to those skilled in the art, without departing from the spirit of my invention, the scope of which is set forth in the annexed claims.

I claim:

1. The combination of a toolpost with a toolholder adapted for rapid attachment and detachment relative thereto, comprising
   (a) vertically disposed complementary dovetail-shaped fittings on both a face of the toolpost and on the toolholder adapted to permit relative vertical movement therebetween for the execution of the attaching and detaching operations,
   (b) a clamping member movably mounted in said toolpost in a direction transverse to said vertical movement,
   (c) said clamping member comprising a surface of revolution having an inner portion of generally cylindrical cross-section and an outer portion of greater diameter than said inner portion,
   (d) said inner cylindrical portion having a recess in the lateral wall thereof provided with a camming face,
   (e) spring means at the end of said inner portion for forcing said clamping member outwardly,
   (f) said outer portion of said clamping member being truncated along a vertical chord substantially coincident with one of the outer edges of the dovetail-shaped fitting on the toolpost with a sloping edge rearwardly of said chord having an inclination corresponding substantially to that of the sloping edge at one side of the dovetail-shaped fitting on the tool post, as well as the sloping edge at the adjacent side of the complementary dovetail-shaped fitting on the toolholder,
   (g) means comprising a movable plunger having an end thereof disposed in contact with said camming face in said recess of said inner cylindrical portion,
   (h) means acting on the opposite end of said plunger for moving said camming face and said clamping member inwardly to force the sloping edge of said clamping member inwardly to tightly clamp said tool holder against said tool post,
   (i) a guide pin on the inner face of the outer portion of said clamping member, and
   (j) said toolpost having a recess of a cross-section corresponding to said guide pin for guiding said pin in the to-and-fro movements of said clamping member and for preventing angular movement of the latter relative to the toolpost.

2. The combination of a toolpost of polygonal section provided with two adjacent faces in vertical planes perpendicular to each other with a toolholder adapted for rapid attachment and detachment relative thereto, comprising
   (a) vertically disposed complementary dovetail-shaped fittings on the toolholder and on each of said faces of said toolpost for selective engagement of the toolholder with either one, by the relative vertical movement therebetween for the execution of the attaching and detaching operations,
   (b) a clamping member movably mounted in each face of said toolpost in a direction transverse to said vertical movement, (c) each clamping member comprising a surface of revolution having an inner portion of generally cylindrical cross-section and an outer portion of greater diameter than said inner portion, (d) each inner cylindrical portion having a recess in the lateral wall thereof provided with a camming face, (e) spring means at the end of each inner portion for forcing said clamping member outwardly, (f) said outer portion of each clamping member being truncated along a vertical chord substantially coincident with one of the outer edges of the dovetail-shaped fitting on the tool post with a sloping edge rearwardly of said chord having an inclination corresponding substantially to that of the sloping edge at one side of the dovetail-shaped fitting on the toolpost, as well as the sloping edge at the adjacent side of the complementary dovetail-shaped fitting on the toolholder, (g) means comprising a movable plunger having an end thereof disposed in contact with each camming face in said recess of each inner cylindrical portion, (h) a rotary sleeve in said toolpost with the end surface thereof in contact with the other ends of each of said movable plungers to effect a control thereof, and provided with a recess therein, (i) a handle connected to said sleeve for the manual rotation of the latter between the clamping and released positions of said clamping member, and (j) a spring pressed detent cooperating with said recess to limit the throw of the handle upon the completion of the releasing movement.

3. A toolpost for the interchangeable mounting of a toolholder thereon comprising:
(a) a dovetail-shaped tenon extending vertically and projecting laterally from a face of said toolpost,
(b) said tenon adapted to engage a toolholder provided with a vertically disposed dovetail-shaped mortise in close interfitting engagement with said tenon and the portions of the face on said toolpost wherefrom said tenon projects,
(c) a clamping member forming part of said tenon comprising a surface of revolution having a truncated circular disk with the truncated portion defined by a vertical chord coincident with one of the vertical edges of said tenon,
(d) said tenon having a recess in its face shaped correspondingly to said clamping member to permit a small amount of transverse movement of said disk from a plane coincident with that of the outer face of the tenon to a position rearwardly thereof as said vertical chord of the clamping member with its dovetail-shaped surface sloping rearwardly therefrom is adapted to be moved rearwardly against the juxtaposed inclined surface of the mortise on the toolholder to clamp together tightly the faces of the toolholder to the toolpost,
(e) said clamping member comprising a cylindrical portion extending rearwardly from said truncated circular disk, and said tool post having a horizontal cylindrical chamber for receiving said cylindrical portion,
(f) spring means between the base of said chamber and the inner end of said cylindrical portion for yieldingly forcing said clamping member outwardly, and
(g) manually operated means for moving said clamping member inwardly in said transverse direction to effect the clamping of the toolholder to the toolpost comprising a camming surface forming part of a recess disposed in the lateral wall of said cylindrical portion, a vertical plunger movably mounted in said toolpost and having a sloping end at the bottom thereof adapted to engage said camming surface, and a rotatable sleeve having the internal end thereof in contact with the upper end of said vertical plunger.

4. A toolpost for the interchangeable mounting of a toolholder thereon comprising:
(a) a dovetail-shaped tenon extending vertically and projecting laterally from a face of said toolpost,
(b) said tenon adapted to engage a toolholder provided with a vertically disposed dovetail-shaped mortise in close interfitting engagement with said tenon and the portions of the face on said toolpost wherefrom said tenon projects,
(c) a clamping member forming part of said tenon comprising a surface or revolution having a truncated circular disk with the truncated portion defined by a vertical chord coincident with one of the vertical edges of said tenon,
(d) said tenon having a recess in its face shaped correspondingly to said clamping member to permit a small amount of transverse movement of said disk from a plane coincident with that of the outer face of the tenon to a position rearwardly thereof as said vertical chord of the clamping member with its dovetail-shaped surface sloping rearwardly therefrom is adapted to be moved rearwardly against the juxtaposed inclined surface of the mortise on the toolholder to clamp together tightly the faces of the toolholder to the toolpost,
(e) said clamping member comprising a cylindrical portion extending rearwardly from said truncated circular disk, and said toolpost having a horizontal cylindrical chamber for receiving said cylindrical portion,
(f) spring means between the base of said chamber and the inner end of said cylindrical portion for yieldingly forcing said clamping member outwardly,
(g) said truncated disk being of a slightly smaller thickness than the depth of the tenon in which it is seated, with the edge at the truncated chord sloping rearwardly from the front face of the clamping member at an inclination corresponding substantially to the sloping edges at one side of the dovetail-shaped tenon on the toolpost above and below said chord,
(h) manually operated means for moving said clamping member inwardly in said transverse direction to effect the clamping of the toolholder to the toolpost, and
(i) means for preventing angular movement of the clamping member in the course of its transverse movement relative to the toolpost comprising a guide pin projecting from the inner face of said disk, and said toolpost having a recess of a cross-section corresponding to said guide pin for guiding said pin in the to-and-fro movements of said clamping member.

5. The combination of a toolpost with a toolholder adapted for rapid attachment and detachment relative thereto, comprising:
(a) vertically disposed complementary dovetail-shaped fittings on both a face of the toolpost and on the toolholder adapted to permit relative vertical movement therebetween for the execution of the attaching and detaching operations,
(b) a clamping member movably mounted in said toolpost in a direction transverse to said vertical movement,
(c) said clamping member comprising a surface of revolution having an inner portion of generally cylindrical cross-section and a disk-shaped outer portion of gerater diameter than said inner portion and of a thickness less than that of said dovetail-shaped fittings,
(d) said outer portion being truncated along a vertical chord substantially coincident with one of the outer edges of the dovetail-shaped fitting on the toolpost with a sloping edge rearwardly of said chord having an inclination coresponding substantially to that of the sloping edge at one side of the dovetail-shaped fitting on the toolpost, as well as the sloping edge at the adjacent side of the complementary dovetail-shaped fitting on the toolholder, said vertical chord having a substantially larger dimension than the diameter of said inner cylindrical portion, (e) said toolpost having a horizontal cylindrical chamber therein for receiving the inner cylindrical portion of said clamping member, (f) spring means between the base of said chamber and the inner end of said cylindrical portion for yieldingly forcing said clamping member outwardly, and (g) manually operated means for moving said clamping member inwardly in said transverse direction to effect the clamping of the toolholder to the toolpost comprising a camming surface forming part of a recess disposed in the lateral wall of said cylindrical portion, a vertical plunger movably mounted in said toolpost and having a sloping end at the bottom thereof adapted to engage said camming surface, and a rotatable sleeve having the internal end thereof in contact with the upper end of said vertical plunger.

6. A device as set forth in claim 5, wherein (a) said toolpost is of polygonal section and the vertically disposed dovetail-shaped fittings thereon which are complementary to the dovetail-shaped fittings on the tool holder are provided on two adjacent faces of the toolpost for the selective engagement of the tool holder with either face, (b) said toolpost having a clamping member movably mounted therein from each of said faces thereof, with a horizontal cylindrical chamber for the inner cylindrical portion of each clamping member extending into said toolpost from each of said faces, (c) a vertical movable plunger cooperating with the inner cylindrical portion of each clamping member, and (d) said rotatable sleeve contacting the upper ends of said vertical plungers in unison.

7. An apparatus as set forth in claim 3 including (a) an arcuate seat in the top surface of said toolpost at said dovetail-shaped fitting therein, and (b) an adjustable set-screw fitting within a threaded bore in the top of said toolholder and provided with an enlarged head adapted to have a segment thereof in overlying relation to said arcuate seat for positioning therein, thereby to effect an adjustable elevation of said toolholder relative to said toolpost preparatory to the clamping of the former to the latter.

8. An apparatus as set forth in claim 7, including a locking bolt extending through said toolholder transversely to the axis of said set-screw for locking said set-screw in adjusted position.

9. An apparatus as set forth in claim 3, wherein said toolpost is square in horizontal cross-section and is fitted with dovetail-shaped tenons on at least two adjacent faces thereof for selective attachment thereto of a correspondingly mortised toolholder, each of said tenons being fitted with a clamping member adapted to be moved simultaneously by said manually operated means.

10. An apparatus as set forth in claim 9 wherein each clamping member is controlled by a separate vertical plunger in said tool post, displaced radially from each other, and each of said vertical plungers is actuated simultaneously by said rotatable sleeve.

11. An apparatus as set forth in claim 3, including a spring-pressed detent mounted in said toolpost radially displaced from said vertical plunger and movable along an axis parallel thereto, the upper end of said detent having a pair of camming faces of different inclination to the vertical, said internal end of said sleeve having a recess with correspondingly shaped faces as said detent to receive the upper end thereof upon completion of a predetermined angular travel of the sleeve in a counterclockwise direction for releasing said clamping member, and to arrest further travel thereof in said direction by the juxtaposed faces of steep inclination in the detent and recess, and the faces of moderate inclination permitting a camming movement of the detent into the toolpost in response to a rotary movement of the sleeve in the reverse direction to effectuate said clamping member.

12. An apparatus as set forth in claim 11 including a locking bolt extending from the exterior of said toolpost to the lateral surface of said detent adapted to lock said detent within said tool post to permit continued movement of said sleeve in said counterclockwise direction incidental to the complete withdrawal of the sleeve from the toolpost.

References Cited

UNITED STATES PATENTS

| | | | |
|---|---|---|---|
| 2,878,705 | 3/1959 | Hirvonen | 82—36 |
| 3,280,673 | 10/1966 | Holmes et al. | 82—36 |
| 3,326,070 | 6/1967 | Muller | 82—36 |

FOREIGN PATENTS

| | | | |
|---|---|---|---|
| 486,812 | 9/1952 | Canada | 82—36(.1) |
| 579,698 | 7/1958 | Italy | 82—36 |

LEONIDAS VLACHOS, Primary Examiner